UNITED STATES PATENT OFFICE 2,575,685

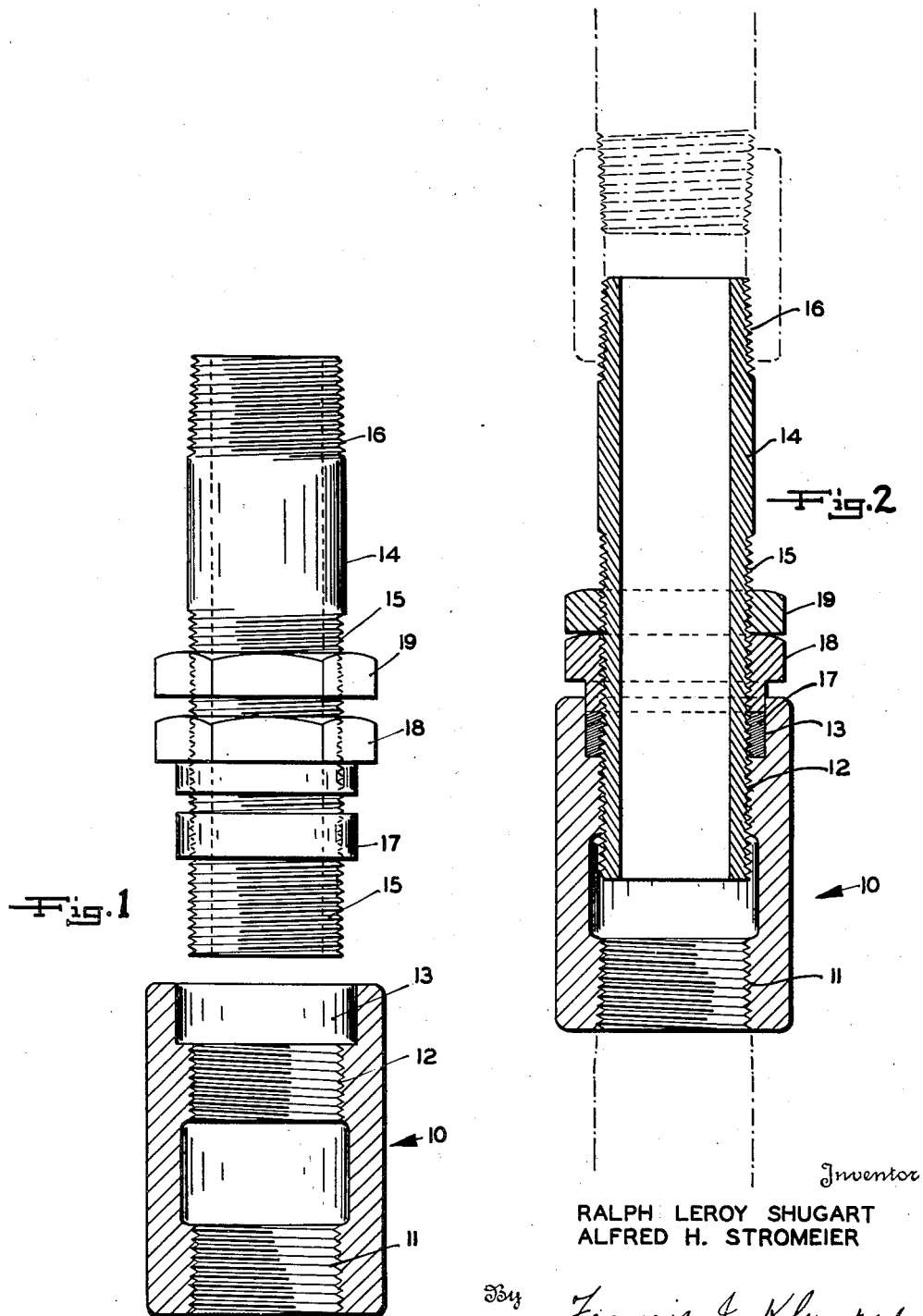
RALPH LEROY SHUGART
ALFRED H. STROMEIER

ADJUSTABLE LENGTH PIPE COUPLING

Ralph Leroy Shugart, Warren, and Alfred H. Stromeier, Youngstown, Ohio

Application December 18, 1947, Serial No. 792,514

1 Claim. (Cl. 285—199)

This invention relates to improvements in pipe couplings and more particularly, to new and useful improvements in the design and construction of pipe couplings of variable length. The practical embodiments of the invention which are in the nature of pipe-unions have particular utility, as will be well understood by those familiar with the art, in connecting two pieces of pipe in end-to-end relation. Devices constructed according to the present invention are further advantageous in that the spacing between the two pieces of pipe to be connected need not be fixed, but may be variable as circumstances require.

It is the primary object of our invention to provide an improved pipe coupling of the general character specified above, which is exceedingly simple in design, economical to produce, and capable of being installed in conventional piping systems with the aid of tools normally employed in the pipe-fitter's trade. A more specific object of the invention is the provision of an improved variable pipe length coupling which, while offering a minimum of resistance to the flow of fluid through a connected pipe line, is yet of minimum over-all or outside diameter, whereby the outward appearance and convenience of the coupling of the invention is enhanced.

Another object of the invention is the provision of an improved fluid tight joint for pipe couplings and the like. In accordance with this aspect of our invention, a mechanical joint is made between an internally threaded member and an externally threaded member fitting therein, and a recess is provided in a portion of the first mentioned member to receive a compressible sealing ring, which by means of a gland nut threaded on to the second mentioned member, is compressed into tight engagement with the threads of the second mentioned member, and simultaneously into pressure contact with an annular surface of the recess to thereby provide an effective seal about the mechanical joint. The interlocking of the material of the sealing ring with the threads of one of the tubular members of the coupling is most effective in not only sealing the joint against the escape of fluid, but in also resisting loosening of the parts.

A still further object of the invention is the provision of a materially simplified pipe-union or coupling for high-pressure conduit application. By the use of a screw-threaded interconnection of substantial axial length between two relatively adjustable parts of the coupling, adequate mechanical strength is imparted and through the use of an improved packing gland between these parts, the escape of fluid is prevented even in the presence of severely high pressures.

The above and other objects and advantages of the invention will become apparent upon the consideration of the following detailed specification and the accompanying drawing, wherein there is disclosed a preferred embodiment of the invention.

In the drawing:

Figure 1 is an exploded view, partly in section and partly in elevation, of a variable pipe-length coupling constructed in accordance with the principles of our invention; and, Figure 2 is a longitudinal section of an assembled coupling constructed in accordance with the teaching of our invention.

Referring to the drawing in detail, the reference numeral 10 designates generally a tubular member which has an end portion of reduced internal diameter provided with the pipe-threads 11. As suggested in Figure 2, the member 10 may, by means of the threads 11, be rigidly attached to the threaded end of a conventional pipe-length which is to be connected by the couplings now being described. Tubular member 10 has a second and axially spaced portion of reduced internal diameter in which is incorporated screw-threads 12. It should be noted that the screw-threads 12 are spaced axially inward of the end of the member 10, which is opposite the threaded end thereof, to provide an annular recess 13, for the recession of a compressible sealing ring as will appear more in detail below:

Adapted to be partially received in the tubular member 10 is a second tubular member 14 in the nature of a determinate length of conventional pipe and a substantial portion of one end of the member 14 is exteriorly screw-threaded as shown at 15. Threads 15 are complementary to the threads 12 of the member 10 so that the member 14 may be screwed into the member 10, a variable extent, as circumstances require. The opposite end of the member 14 is exteriorly threaded, as shown at 16 for connection with a conventional interiorly threaded sleeve type of pipe coupling which may be fastened onto the end of a second conventional pipe length to be connected.

We prefer to make the lead of all the pipe and screw threads of the assembly identical and to make all these threads of the same direction so that in applying the coupling of the invention to existing piping installations it is not necessary to axially shift any of the pipes to be connected.

Thus, by referring to Figure 2 it will be noted that if the member 10 is run up on the member 14, a maximum extent, the member 14 may be threaded into the conventional pipe coupling above described or into any other fitting having appropriate female threads and in so doing, the member 10 may be axially aligned with the pipe or other fitting to be inter-connected thereby.

Now by rotating the member 10 on the member 14 the member 10 will be caused to move outwardly along the member 14 and to simultaneously be threaded on to the male threaded part of the pipe or other fitting to be connected. It should readily be understood that in the practice of the invention the member 14 may be furnished in different lengths or it may be of a long standard length, in which case the screw threaded end thereof may be cut off to any length desired.

Received within the recess 13 is a compressible sealing ring 17, which is arranged to be axially compressed by the gland nut 18 which is threaded on the screw threads 15. As shown in the drawing, the screw threaded interconnection between the member 14 and the nut 18 is of substantial axial length, and this feature co-acting with the substantial axial length of the screw threads 12 allows the nut 18 to be pulled down very tightly, thereby subjecting the material of the ring 17 to a heavy compressive force, which causes the material to flow radially inward and outward into tight engagement with the screw threads 15 and the outer wall of the recess 13, respectively. In this manner a most effective seal is obtained which is operative to withstand either low or high pressures. If desired, a lock nut 19 may be provided for the packing gland nut 18.

It should now be apparent that we have provided an improved adjustable length pipe coupling which accomplishes the objects initially set out. The coupling of the invention is extremely simple in design, requiring but three major parts, any and all of which may be expeditiously and economically produced on automatic machinery of conventional design. The coupling may be readily installed and when installed, presents a minimum of resistance to the flow of fluid through it and the connected pipe lengths. Also, the exterior of the coupling is of pleasing design, and of minimum dimension, thereby enabling the coupling to be used in many circumstances where the installation of more conventional couplings may be impossible or undesirable.

It should also be particularly noted that the screw threads 12 and 15 of the parts 10 and 14, respectively, are of the straight or machine variety as distinguished from tapered pipe threads so that the member 14 may be screwed into member 10 a widely varying extent. This provides for considerable adjustment in the length of a coupling formed of any particular sizes of members 10 and 14 and, further, enables a strong fluid-tight joint to be made between the spaced opposed ends of two pipe lengths without moving the pipe lengths in any direction and without setting up any stresses whatever in said lengths.

The above specifically described embodiments of the invention should be considered as illustrative only as obviously many changes may be made therein without departing from the spirit or scope of the invention. Reference should therefore be had to the appended claim in determining the scope of the invention.

We claim:

An adjustable length pipe coupling comprising in combination a tubular member having conventional internal tapered pipe threads at one end and having conventional machine threads of uniform diameter adjacent its opposite end portion, said tubular member being of enlarged internal diameter intermediate said pipe threads and said machine threads, said opposite end portion having a larger internal diameter than the internal diameter of the machine-threaded portion to provide an annular recess, a compressible sealing ring in said recess, a second tubular member externally machine-threaded at one end for engagement with the internally machine-threaded portion of said first mentioned tubular member and externally pipe-threaded at its opposite end, said machine threads and said pipe threads having substantially the same pitch, and a packing gland nut threaded on the machine-threaded portion of said second tubular member and adapted to enter said recess to compress the sealing ring therein.

RALPH LEROY SHUGART.
ALFRED H. STROMEIER.

REFERENCES CITED

The following references are of record in the file of this patent:

UNITED STATES PATENTS

| Number | Name | Date |
|---|---|---|
| 438,752 | Lawson | Oct. 21, 1890 |
| 1,955,831 | Raybould | Apr. 24, 1934 |
| 2,448,232 | Muse | Aug. 31, 1948 |

FOREIGN PATENTS

| Number | Country | Date |
|---|---|---|
| 293,674 | Great Britain | July 12, 1928 |